United States Patent
Musat et al.

(10) Patent No.: US 8,325,035 B2
(45) Date of Patent: Dec. 4, 2012

(54) SYSTEM ENABLING A USER OF A VEHICLE TO LOCATE SAME BY MEANS OF A RADIO SIGNAL

(75) Inventors: Ciprian Musat, Creteil (FR); Eric Menard, Lesigny (FR)

(73) Assignee: Valeo Securite Habitacle, Creteil (FR)

( * ) Notice: Subject to any disclaimer, the term of this patent is extended or adjusted under 35 U.S.C. 154(b) by 747 days.

(21) Appl. No.: 12/410,985

(22) Filed: Mar. 25, 2009

(65) Prior Publication Data

US 2009/0243896 A1 Oct. 1, 2009

(30) Foreign Application Priority Data

Mar. 25, 2008 (FR) ...................... 08 01610

(51) Int. Cl.
*G08B 1/08* (2006.01)

(52) U.S. Cl. .......... 340/539.32; 340/636.11; 340/825.49

(58) Field of Classification Search ............. 340/539.32, 340/571, 588, 636.11, 991–995.1, 539.21–539.22, 340/825.49
See application file for complete search history.

(56) References Cited

U.S. PATENT DOCUMENTS

| | | | |
|---|---|---|---|
| 5,418,537 A * | 5/1995 | Bird ................... | 342/357.55 |
| 5,448,248 A * | 9/1995 | Anttila ................ | 342/400 |
| 5,526,357 A * | 6/1996 | Jandrell ............... | 370/346 |
| 7,053,829 B2 * | 5/2006 | Krause et al. ......... | 342/398 |
| 2002/0008614 A1 * | 1/2002 | Yeh et al. ............. | 340/425.5 |
| 2003/0034887 A1 | 2/2003 | Crabtree et al. | |
| 2004/0130488 A1 * | 7/2004 | De Champlain ...... | 342/374 |
| 2006/0244574 A1 | 11/2006 | New et al. | |

FOREIGN PATENT DOCUMENTS

| EP | 1223435 A1 | 7/2002 |
|---|---|---|
| WO | WO 0077329 A2 | 12/2000 |
| WO | WO 03058272 A1 | 7/2003 |

OTHER PUBLICATIONS

INPI—French International Search Report FR705598/FR0801610, dated Dec. 3, 2008, 1 page.

* cited by examiner

*Primary Examiner* — Daniel Previl

(74) *Attorney, Agent, or Firm* — Howard & Howard Attorneys PLLC

(57) ABSTRACT

The invention relates to a system which can give a vehicle user an indication related to a direction to take to find back his vehicle. The said system comprises a hand-held object (1) to be taken by the user and a module (2) to be installed on the vehicle. The module (2) is equipped with a first emitting device (3) of a first radio signal (5). The latter (5) is a directed radio signal which is emitted within an angular sector of an angle A less than 90°.

19 Claims, 2 Drawing Sheets

SYSTEM ENABLING A USER OF A VEHICLE TO LOCATE SAME BY MEANS OF A RADIO SIGNAL

RELATED APPLICATIONS

This application claims priority to and all the advantages of French Patent Application No. FR 08/01610, filed on Mar. 25, 2008.

TECHNICAL FIELD OF THE INVENTION

This invention relates to the field of systems enabling a user of a vehicle to locate the latter after being separated from it. It relates to such a system as well as to a method for implementing the latter.

PRIOR ART

In the automobile industry, it is known to provide a vehicle with a system suitable for providing information to the user of the vehicle enabling said user to find the vehicle when separated therefrom.

Document US 2002/0008614 (YEH et al.) describes such a system including a portable object, intended to be available to the user, and a module attached to the vehicle. The portable object and the module are capable of communicating with one another by means of radio waves.

More specifically, the portable object is equipped with a first device for transmitting a first high-frequency radio signal, on the order of 930 MHz, for example. The first radio signal has the feature of being omnidimensional, i.e. it is capable of being propagated equivalently in every direction surrounding its point of transmission. The first radio signal is received by a first receiving device provided in the module. The module includes calculation means for determining an angle of input of the first radio signal. The module is also equipped with a second device for transmitting a second radio signal. This signal is received by a second receiving device provided in the portable object. Said portable object is equipped with means for processing the second signal received in order to determine a direction to be followed by the user in order to find the vehicle, which direction is provided to the user by means displaying the direction to be followed.

The display means include four directional arrows capable of being individually activated in order to indicate the direction to be followed, for example, left, right, forward or backward. The display means also include two altitude arrows also capable of being individually activated in order to indicate to the user the need to go up or down in order to find the vehicle.

Such a system is implemented by activating a control button provided on the portable object. Such an activation implements the first transmission device, which transmits the first omnidirectional radio signal.

Such a system has numerous disadvantages.

The radio transmission powers necessary for the first and second transmission devices are high and thus consume large amounts of electricity. More specifically, the portable object provided in said first transmission device comprises a 12 V battery for powering the latter. Therefore, the bulk and weight of the portable object are excessive.

In addition, the calculation and processing means necessary for determining the angle of input and the direction to be followed, respectively, are also important and are capable of generating excessive bulk and electrical consumption.

These disadvantages are ergonomically detrimental and prevent industrial exploitation of such a system.

SUBJECT MATTER OF THE INVENTION

The objective of this invention is to propose a system so that a user of a vehicle can easily and quickly find the latter when separated therefrom, in which said system is simple to implement, consumes little electrical energy, and is small and lightweight. This invention also relates to a method for implementing such a system, which method is easy to implement.

The system of this invention is a system suitable for providing a user of a vehicle with an indication on a direction to be taken in order to find said vehicle. Said system includes a portable object intended to be available to the user and a module intended to be attached to the vehicle. The module is equipped with at least one first transmitter of a first radio signal. The first radio signal is a directive radio signal transmitted according to a heading C contained within an angular section with an angle A smaller than 90°.

The first transmitter is capable of transmitting a first so-called directive radio signal, which is transmitted according to the heading C, the latter being contained within said angular section. The heading C in particular forms a bisector of the angular section.

The angle A is preferably between 25° and 35°.

The heading C varies advantageously as an increasing function of time.

These arrangements are such that the first transmitter transmits the first directive radio signal by scanning the space that surrounds it at a frequency of between 0.1 and 100 Hz.

The portable object is advantageously equipped with a first receiver of the first radio signal.

According to a first alternative embodiment, the module includes means for modulating the first radio signal as a function of the heading C.

The portable object is preferably equipped with means for identifying a first radio signal with the highest amplitude among a plurality of first radio signals received.

The portable object is preferably equipped with means for analyzing the modulation of the first radio signals received so as to deduce a first information item relating to a heading $C_{max}$ according to which the first radio signal with the highest amplitude has been transmitted.

According to a second alternative embodiment, the module is also equipped with a second transmitter of a second omnidirectional radio signal.

The second omnidirectional signal is transmitted according to the directions and has the same features according to the set of directions in which it is simultaneously transmitted.

These arrangements are such that the portable object is free of any transmission device used in the system, capable of providing the indication relating to the location of the vehicle. This results in low bulk for the portable device as well as an improvement concerning the electrical consumption necessary for operating the portable object.

The implementation of the first transmitter, in particular the transmission of a first signal in a direction determined by a heading, is advantageously placed under the control of a transmission of a second radio signal.

The portable object is preferably equipped with means for determining a second information item relating to a phase shift between the second signal and the first signal received for determining the base direction D1.

The second information item is, for example, a characteristic of a time interval that has passed between the respective receivings of the second and the first radio signals.

The portable object is advantageously equipped with means for deducing the indication relating to the direction to be taken in order to find said vehicle on the basis of either one of the first and/or second information items.

Preferably, the portable object is equipped with at least any one of the first means for processing a radio signal received in order to evaluate a distance between the module and the portable object, and second means for processing a signal received in order to correct distortions undergone by the latter between the module and the portable object.

The portable object is in particular equipped with means for displaying said indication.

Such a method for implementing such a system is characterized in that it comprises the following steps, consisting of:
- transmitting a first directive radio signal according to a heading C from the module,
- varying the transmission heading C of the first radio signal,
- receiving at least the first radio signal from the portable object,
- deducing, from information relating to at least the first radio signal, the indication relating to the direction to be taken in order to find said vehicle.

The deduction step comprises, for example, a step of analyzing a modulation of the first radio signal as a function of the heading C, according to which the latter is transmitted.

The deduction step comprises, for example, another step of determining a phase shift between the first radio signal received and a second omnidirectional radio signal transmitted by the module.

DESCRIPTION OF THE FIGURES

This invention can be better understood, with relevant details becoming clear, on reading the following description of alternative embodiments in reference to the figures of the appended drawings, in which.

In the automobile industry, it is commonplace for user of a vehicle to park the latter, then to move away from it by a substantial distance. After being separated from the vehicle, the user often has difficulty finding it quickly, in particular when the vehicle is parked in an environment unknown to the user. For this reason, it is known to provide the vehicle with a system suitable for providing the user with an indication relating to a direction to be taken in order to find the vehicle.

Figure 1:
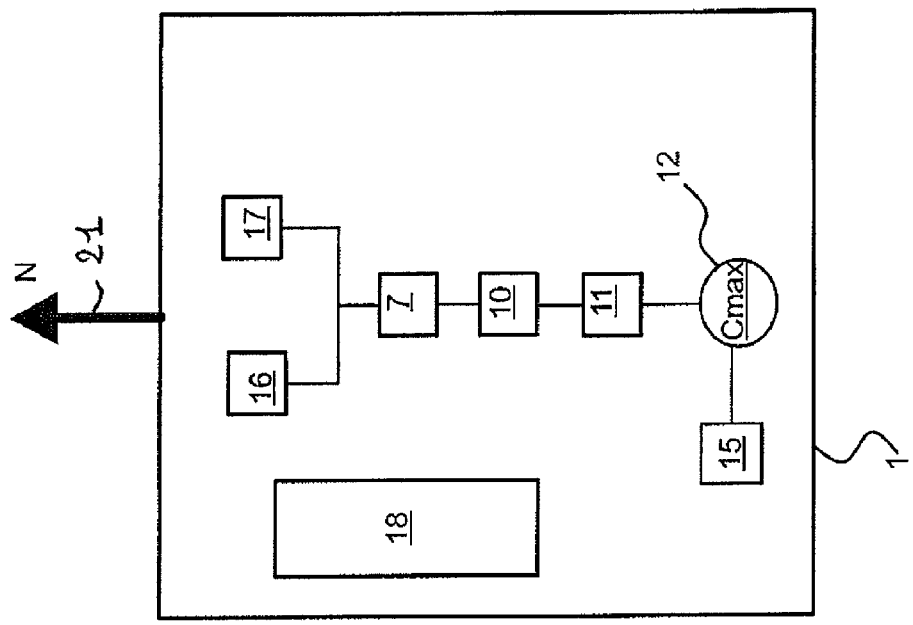
FIGS. 1 and 2 are respective diagrammatic views of alternative embodiments of this invention.
Figure 1:
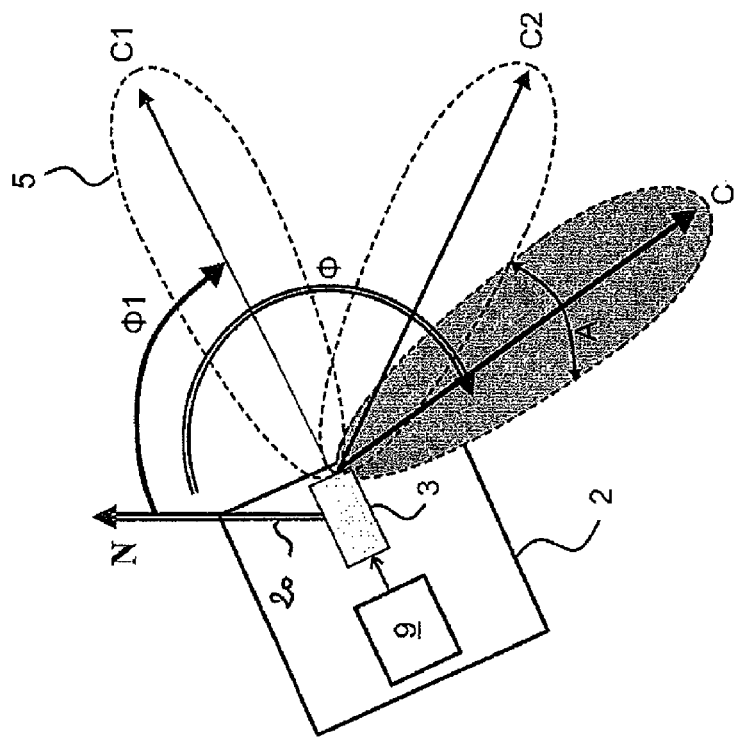
Figure 2:
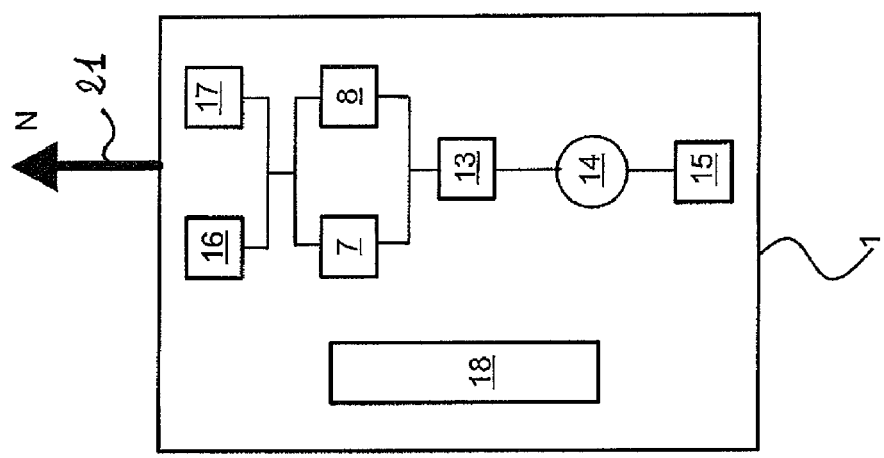
Figure 2:
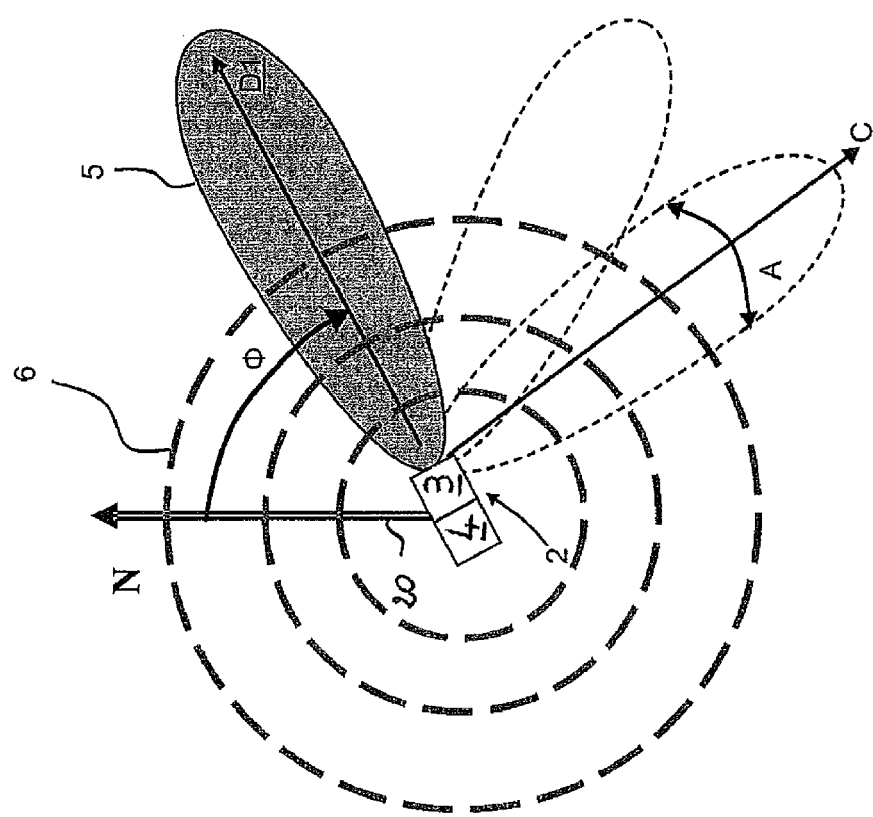

Among these systems, we know those implementing a portable object 1 intended to be available to the user, and a module 2 intended to be attached to the vehicle, as shown in FIGS. 1 and 2, in which the portable object 1 and the module 2 are capable of communicating with one another by means of radio signals. It is noted that in each of the figures, the portable object 1 and the module 2 are shown at different scales for the sake of representation. The systems known from the prior art are difficult to implement, consume large amounts of electrical energy, and are heavy and bulky, in particular the portable object 1 that the user must hold in order to find the vehicle that he/she has left.

To overcome these disadvantages, this invention proposes that only the module 2 be equipped with means 3, 4 for transmitting radio signals 5, 6, with the portable object 1 being equipped with means 7, 8 for receiving the radio signals 5, 6 transmitted. Thus, the means 3, 4 transmitting radio signals 5, 6, which are bulky, heavy and consume large amounts of electrical energy, are assigned only to the module 2 installed in the vehicle, where the bulk and electrical supply constraints are less strict than for the portable object 1.

More specifically, the module 2 is equipped with a first transmitter 3 of a first radio signal 5 and the portable object 1 is equipped with a first receiver 7 of the first radio signal transmitted 5. The latter 5 has the feature of being directive, i.e. being transmitted according to a preferred direction, defining a transmission heading C. In fact, such a first radio signal 5 is primarily transmitted within an angular section with an angle A, while the transmission heading C forms a bisector of the angular section. The angle A is preferably smaller than or equal to 90°, and in particular on the order of 30°.

The first radio signal 5 also has the feature of being a rotating signal, i.e. the transmission heading C of the first radio signal 5 varies over time as an increasing function, whether linear or discrete. For example, the first radio signal 5 is successively transmitted according to headings C1, C2 ... Cn, forming respective angles $\Phi 1, \Phi 2, \ldots \Phi n$ with a reference direction N, such as that of the magnetic north. It is clear from this arrangement that the module 2 includes a magnetic compass 20. The angles $\Phi 1, \Phi 2, \ldots \Phi n$ form, for example, a series increasing by 20° or 30°, at a frequency in particular between 0.1 and 100 Hz. The first radio signal 5 is, for example, transmitted by a plurality of antennas installed on the vehicle, or even by a single rotary antenna. Such a system enables the information necessary for locating the vehicle to be updated regularly at a time interval on the order of one second, which is suitable for the speed of the walking movement of the user. Indeed, a time interval of one second appears to be a good compromise, being neither too short to accumulate redundant quasi-equivalent information, nor so long that the indications are provided too far apart. In addition, this compromise enables the energy consumption of the module to be contained within acceptable proportions, while ensuring good measurement accuracy.

According to a first alternative embodiment shown in FIG. 1, the module 2 is equipped with means 9 for modulating the first radio signals 5 transmitted as a function of the headings C1, C2, ... Cn according to which they are transmitted. Thus, the modulation means 9 enable a series of first radio signals 5 to be transmitted, which are individually characteristic of the specific headings C1, C2, ... Cn according to which they are successively transmitted.

The portable object 1 is equipped with means 10 for identifying a first radio signal 5 received, which has the highest amplitude among all of the amplitudes of the first radio signals 5 received. The portable object 1 is also provided with means 11 for analyzing the modulation of the first signals received 5 so as to deduce a first information item 12 therefrom, relating to a heading Cmax according to which the first radio signal 5 with the highest amplitude was transmitted. However, the first radio signal 5 received that has the highest amplitude is that of which the attenuation is the lowest, i.e. that having traveled a direct path between the module 2 and the portable object 1, which is the shortest. Cmax therefore constitutes the direction to be taken in order to find the vehicle, but in an opposite direction. On the basis of the first information item 12, deduction means 15 provided in the portable object 1 are capable of determining the direction to be taken in order to find the vehicle.

Alternatively, an amplitude or frequency modulation principle is used. In this case, two signals are mixed: a first at high frequency, which ensures the propagation (the carrier) and a reduced frequency signal (modulating signal) containing the heading information of the signal 5. This reduced frequency signal is encrypted so that one single user can exploit the signals sent by the module 2 without being disrupted and without disrupting other users of the same system.

According to a second alternative embodiment shown in FIG. 2, the module is also equipped with a second transmitter 4 of a second radio signal 6, which is omnidirectional, unlike the first radio signal 5. This second radio signal 6 is detected and received by the first receptor 7 identical to the one capable of receiving the first signal 5. Alternatively, the portable object 1 can also be equipped with a second receiver 8 of the second radio signal 6. The implementation of the first transmitter 3 is controlled by the implementation of the second transmitter 4. In other words, the first radio signal 5 is transmitted by the first transmitter 3 only when the second radio signal 6 is transmitted by the second transmitter 4. The transmission of the first signal 5 is done immediately after the transmission of the second signal 6 and according to an angular increment, for example, of 10°, every ten milliseconds beginning at the north, with the latter being determined by the magnetic compass 20 integrated in the module 2. The portable object 1 contains the same increment information and also includes a magnetic compass 21 indicating the north. The portable object 1 is provided with means 13 for determining a second information item 14 relating to a receiving phase shift α between the second signal 6 and the first signal 5. The second information item 14 therefore consists of a time interval that has passed between the respective receivings of the second signal 6 and the first signal 5. On the basis of the second information item 14, deduction means 15, provided in the portable object 1, are capable of determining the direction to be taken in order to find the vehicle by comparing the time interval measured and the increment registered in the portable object 1. For example, if the second information item corresponds to fifty milliseconds, it means that the direction to be taken corresponds to fifty milliseconds, which means that the direction to be taken in order to reach the vehicle is located at two hundred and thirty degrees with respect to the north, i.e. fifty degrees to which one hundred eighty degrees are added in order to go in the direction of the vehicle.

According to one or the other of the two aforementioned alternatives, the portable object 1 is capable of being equipped with first means 16 for processing either one of the first radio signal 5 and/or the second radio signal 6, in order to evaluate a distance between the module 2 and the portable object 1. This evaluation of the distance is performed by measuring the power of the signal received or by measuring the propagation delay of the signal. In this case, the module 2 and the portable object 1 are each equipped with a reference clock and the method consists of measuring the time shift between the signal and the clock after a transmission sequence between the module 2 and the portable object 1.

Similarly, the portable object 1 is capable of being equipped with second means 17 for processing either one of the first signal 5 and/or the second signal 6 received in order to correct distortions undergone by the latter between the module 2 and the portable object 1, following reflections of the signals, on walls, for example. These processing means 17 tests the coherence of the signals received by the portable object 1 by comparing the direction of the signal received with the heading used by the module 2 to send the signal 5. This enables reflected or parasitic signals to be eliminated. The direction of the signal received is determined by means of the first or second receiver 7, 8, which is in this case a directive antenna capable of determining the direction of origin of the signal 5 by comparison with a reference provided by a magnetic compass 21 mounted on the portable object. If the comparison between the direction detected by the portable object 1 and the direction of transmission of the module 2 is acceptable, the screen of the portable object shows an arrow in the direction detected by the receiver, but turned 180° in order to enable the user to turn toward the vehicle equipped with the module 2.

Alternatively, the directional antenna is replaced by a plurality of unidirectional antennas distributed over 360°. The detection of the receiving direction is hen implemented by using a so-called "channel formation" method or a so-called "Capon" method, or a method called MUSIC ("MULtiple Signal Classification"). The advantage of such a solution lies in the fact that the plurality of antennas enables the portable object to be made more compact by arranging electronic components between each of the antennas.

Finally, the portable object 1 is equipped with means 18 for displaying said indication. Such display means 18 are, for example, a liquid crystal display or the like on which the indication to be followed, for example the representation of an arrow, is projected.

FIGS. 1 and 2 comprise, for each of the modules 2 and portable objects 1, an arrow referenced N representing the magnetic compasses 20 and 21, with the latter giving, for example, the north.

The invention claimed is:

1. A system suitable for providing a user of a vehicle with an indication on a direction to be taken in order to find the vehicle, which system includes a portable object (1) intended to be available to the user and a module (2) intended to be attached to the vehicle, which module (2) is equipped with at least one first transmitter (3) of a first radio signal (5), characterized in that the first radio signal (5) is a directive radio signal transmitted according to a heading C contained within an angular section with an angle A smaller than 90°.

2. A system according to claim 1, characterized in that the angle A is between 25° and 35°.

3. A system according to claim 1, characterized in that the heading C varies as an increasing function of time.

4. A system according to claim 1, characterized in that the portable object (1) is equipped with a first receiver (7) of the first radio signal (5).

5. A system according to claim 1, characterized in that the module (2) includes means for modulating (9) the first radio signal (5) as a function of the heading C.

6. A system according to claim 1, characterized in that the portable object (1) is equipped with means for identifying (10) a first radio signal (5) with the highest amplitude among a plurality of first radio signals (5) received.

7. A system according to claim 6, characterized in that the portable object is equipped with means for analyzing (11) the modulation of the first radio signals (5) received so as to deduce a first information item (12) relating to a heading Cmax according to which the first radio signal (5) with the highest amplitude has been transmitted.

8. A system according to claim 7, characterized in that the portable object (1) is equipped with means for deducing (15) the indication relating to the direction to be taken in order to find the vehicle on the basis of either one of the first (12) and/or second (14) information items.

9. A system according to claim 1, characterized in that the module (2) is also equipped with a second transmitter (4) of a second omnidirectional radio signal (6).

10. A system according to claim 9, characterized in that the transmission of the first radio signal (5) is placed under the control of the transmission of a second radio signal (6).

11. A system according to claim 9, characterized in that the portable object (1) is equipped with means for determining (13) a second information item (14) relating to a phase shift α characteristic of a time interval that has passed between receipt of the second radio signal (6) and receipt of the first radio signal (5).

12. A system according to claim 11, characterized in that the portable object (1) is equipped with means for deducing (15) the indication relating to the direction to be taken in order to find the vehicle on the basis of either one of the first (12) and/or second (14) information items.

13. A system according to claim 1, characterized in that the portable object (1) is equipped with at least any one of the first means for processing (16) a radio signal received in order to evaluate a distance between the module (2) and the portable object (1), and the second means for processing (17) a signal received in order to correct distortions undergone by the latter between the module (2) and the portable object (1).

14. A system according to claim 1, characterized in that the portable object (1) is equipped with means for displaying (18) the indication.

15. A system according to claim 1, in which the module (2) and the portable object (1) each include a magnetic compass.

16. A method for implementing a system according to claim 1, characterized in that the method comprises the following steps:

transmitting a first radio signal (5) according to heading C from the module (2), varying the transmission heading C of the first radio signal (5), receiving at least the first radio signal (5) from the portable object (1), deducing, from information (12, 14) relating at least to the first radio signal (5), the indication relating to the direction to be taken in order to find the vehicle.

17. A method according to claim 16, characterized in that the deduction step comprises a step of analyzing a modulation of the first radio signal (5) as a function of the heading C, according to which the first radio signal (5) is transmitted.

18. A method according to claim 16, characterized in that the deduction step comprises a step of determining a phase shift between a second omnidirectional radio signal (6) and the first radio signal (5) received, in which each of the signals is transmitted by the module (2).

19. A system according to claim 1, characterized in that the first radio signal transmitted according to a heading C forms an angle ($\phi$) with respect to a magnetic north.

* * * * *